United States Patent [19]
Hosaka

[11] 4,386,427
[45] May 31, 1983

[54] FAIL-SAFE DEVICE IN AN ELECTRONIC CONTROL SYSTEM FOR AN AUTOMOTIVE VEHICLE

[75] Inventor: Akio Hosaka, Yokohama, Japan

[73] Assignee: Nissan Motor Company, Ltd., Kanagawa, Japan

[21] Appl. No.: 246,893

[22] Filed: Mar. 23, 1981

[30] Foreign Application Priority Data

Mar. 24, 1980 [JP] Japan .................................. 55-36258

[51] Int. Cl.³ .............................................. G06F 11/30
[52] U.S. Cl. .................. 371/11; 364/431.11; 371/16; 371/61
[58] Field of Search .............. 364/431.11, 200; 371/8, 371/9, 10, 11, 16, 60, 61

[56] References Cited

U.S. PATENT DOCUMENTS

| | | | |
|---|---|---|---|
| 3,786,433 | 1/1974 | Notley et al. | 371/9 X |
| 3,803,568 | 4/1974 | Higashide | 371/8 |
| 4,072,852 | 2/1978 | Hogan et al. | 371/12 |
| 4,117,459 | 9/1978 | Douglas et al. | 371/16 |
| 4,118,792 | 10/1978 | Struger et al. | 364/900 |
| 4,144,448 | 3/1979 | Pisciotta et al. | 371/61 |
| 4,245,315 | 1/1981 | Barman et al. | 371/11 X |
| 4,251,885 | 2/1981 | Dodt et al. | 371/16 X |
| 4,255,789 | 3/1981 | Hartford et al. | 364/431 |

FOREIGN PATENT DOCUMENTS 2845350 4/1979 Fed. Rep. of Germany .
1502184 2/1978 United Kingdom .

OTHER PUBLICATIONS

"Einfuhrung in die Midprozessor-Technik", *Texas Instruments*, Chapter 14, pp. 251-269 (1977).

*Primary Examiner*—Jerry Smith
*Attorney, Agent, or Firm*—Schwartz, Jeffery, Schwaab, Mack, Blumenthal & Koch

[57] ABSTRACT

A fail-safe device in an electronic control system for an automotive vehicle comprises a monitoring device for detecting failure of the CPU and generating a signal indicative of error in the CPU, and a storage device for outputting data to replace the CPU output while the CPU is operative. Thus, the control system can work for controlling a vehicle control device even during CPU failure.

13 Claims, 5 Drawing Figures

4,386,427

FAIL-SAFE DEVICE IN AN ELECTRONIC CONTROL SYSTEM FOR AN AUTOMOTIVE VEHICLE

BACKGROUND OF THE INVENTION

The present invention relates generally to a fail-safe device in an electronic control system for an automotive vehicle. More particularly, the invention relates to a fail-safe device having a means for outputting output control data to a vehicle controlling device which is part of a vehicle electronic control system. The means is connected with an output unit of the control system so that the output therefrom can be used for engine control to replace the output of a central processing unit (CPU) when the central processing unit fails to operate.

Recently, electronic control systems using a microcomputer have been employed in automotive vehicles for controlling various vehicle devices. For example, it is popular to use the electronic control system in an engine control system for controlling engine revolution speed, fuel amount to be fed into the combustion chamber of the engine, spark ignition timing and so on. In such electronic control systems, the CPU operates to output a control output to be fed to the vehicle device to be controlled. The vehicle device which is part of the electronic control system is inoperative unless the CPU is operating correctly. Therefore, the vehicle devices may stop operation when the CPU fails to operate.

For example, in the case in which the vehicle device incorporated within the electronic control system is the internal combustion engine, failure of CPU operation may possibly cause the engine to stop operation and thus stop the vehicle.

Therefore, a fail-safe device for the electronic control system for the automotive vehicle is necessary, so that the fail-safe device can replace the CPU operation for maintaining the controlled vehicle device in an operative state even when the CPU fails.

SUMMARY OF THE INVENTION

Therefore, it is an object of the present invention to provide an electronic control system for an automotive vehicle which can work even when the CPU fails to operate.

Another and more specific object of the present invention is to provide a fail-safe device in an electronic control system for an automotive vehicle which includes a means for generating an output to replace data outputted from the CPU when the CPU fails.

The above-mentioned and other objects are accomplished by a fail-safe device in an electronic control system for an automotive vehicle according to the present invention, wherein the fail safe device comprises a means for detecting failure of the CPU and for generating a signal indicative of error in the CPU, and a means for outputting data to replace the CPU output while the CPU is faulty.

In accordance with the invention, there is provided a fail-safe device in an electric control system for an automotive vehicle comprising, a microcomputer having a central processing unit and an output unit, a monitor circuit connected with the central processing unit in order to detect the failure of the central processing unit operation and to generate a command when failure of the central processing unit is detected, an output signal generator for outputting a pre-set output, and a switching circuit coupled with the output unit of the microcomputer, which changes the position thereof between a first position connecting the central processing unit with the output unit and a second position connecting the output signal generator with the output unit. The switching circuit is maintained in the first position in the normal state of the CPU and turned to the second position in response to the command fed from the monitor circuit.

BRIEF DESCRIPTION OF THE DRAWINGS

The present invention will become fully understood from the detailed description given hereinbelow and from the accompanying drawings of the preferred embodiment of the present invention, which, however, should not be taken as limitative of the present invention but for elucidation and explanation only.

In the drawings.

DESCRIPTION OF THE PREFERRED EMBODIMENT

Figure 1:
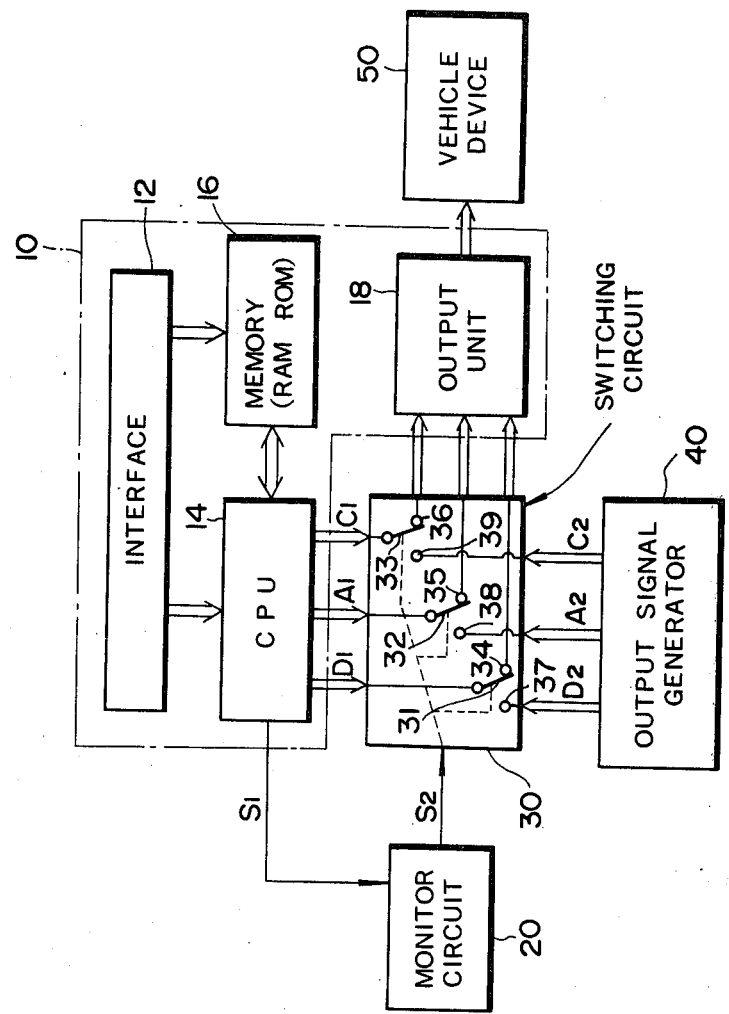
FIG. 1 is a schematic block diagram of a preferred embodiment of an electronic control system of an automotive vehicle.

Referring now to the drawings, particularly to FIG. 1, there is schematically illustrated a preferred embodiment of an electronic control system for an automotive vehicle, which includes a fail-safe device according to the present invention. As per se well known, a microcomputer 10 comprises an inter-face 12, a CPU 14, a memory unit 16 which includes a read-only memory (ROM) and a random-access memory (RAM), and an output unit 18. A monitoring circuit 20 is connected with the CPU 14 in order to receive therefrom a program run signal $S_1$. The monitoring circuit 20 checks the CPU operation to determine whether the CPU 14 operates in a normal condition by detecting the presence and absence of the program run signal $S_1$ and generates a command $S_2$ when it detects failure of the CPU operation i.e., when the program run signal $S_1$ is absent for more than a predetermined period of time. A switching circuit 30 is interpositioned between the CPU 14 and the output unit 18. The switching circuit 30 has switching elements 31, 32 and 33 which are respectively connected with a data bus $D_1$, an address bus $A_1$ and a control bus $C_1$ of the CPU 14. The switching elements 31, 32 and 33 are normally positioned respectively at switch terminals 34, 35 and 36 which are respectively connected with the output unit 18. An output signal generator 40 is connected with the switching circuit 30 through a data bus $D_2$, an address bus $A_2$ and a control bus $C_2$ so that the outputs thereof can be substituted for the outputs of the CPU 14 while the operation of the CPU 14 is inoperative due to failure. Respective data bus $D_2$, address bus $A_2$ and control bus $C_2$ are connected with switch terminals 37, 38 and 39 which are respectively located opposing the switch terminals 34, 35 and 36.

The switching elements 31, 32 and 33 are responsive to the command $S_2$ generated in the monitoring circuit 20 when the CPU 14 has failed. If the command $S_2$ is inputted to the switching circuit 30, the switching elements 31, 32 and 33 are moved toward the switch terminals 37, 38 39 and thus alternating their position. In this result, the CPU 14 is disconnected from the output unit 18, and the output signal generator 40 is connected with the output unit 18 to provide outputs thereof to a vehicle device 50 to control same.

Figure 2:
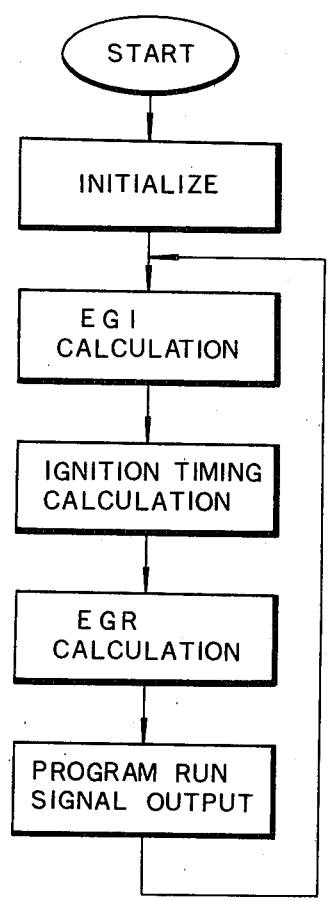
FIG. 2 is a flowchart of an example of operation effected by the control system of FIG. 1.
Figure 3:
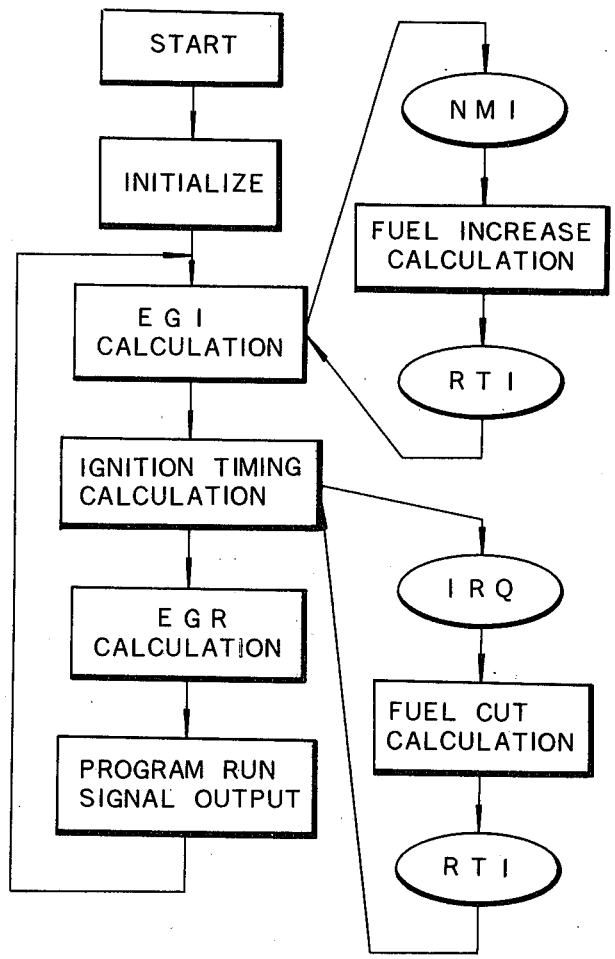
FIG. 3 is a flowchart of another example of operation of the control system of FIG. 1.

Here, examples of the control programs to be executed are explained for a better understanding of the invention. Assume the control programs are to control the internal combustion engine of a fuel injection type with an exhaust gas recirculation system, the microcomputer controls the fuel injection amount, spark ignition timing and exhaust gas recirculation rate. In such a case, the overall structure of the program is a loop which is executed once for each cycle of the computation. Thus at the end of a computation cycle, execution returns to the beginning of the program. Accordingly, as shown in FIG. 2, a block which outputs the program run signal $S_1$ is inserted after a block for calculating the exhaust gas recirculation rate, which is represented as "EGR calculation" in FIG. 2 so that the program run signal $S_1$ is output after completion of each cycle of operation. Such output will continue as long as the program operation is executed normally. The microcomputer has an interrupt function wherein when a particular circumstance arises, it interrupts the executing program to execute a specified program beginning at a specified interrupt address, and then, upon completion thereof, returns to the portion of point at which interruption occurred to resume execution of the previous program. Interrupts are classified as for example NMI (Non Maskable Interrupt) and IRQ (Interrupt Request). As shown in the flowchart of FIG. 3, when an NMI is effected during a block for calculating the fuel injection amount which is represented as "EGI calculation" in FIGS. 2 and 3, the computer interrupts this calculation and transfers control to the calculation for increasing the amount of fuel to be injected, and then, upon completion thereof, returns to the EGI calculation. When an IRQ is effected during ignition timing calculation, the computer interrupts the ignition timing calculation to transfer control to effect a fuel cut off calculation, and then, upon completion thereof, returns to the ignition timing calculation.

As described above, when interrupts are included in the microcomputer processing, as understood from the flowchart of FIGS. 2 and 3, the method which outputs a program run signal on completion of each cycle of the basic program has the defect that the program run signal $S_1$ is output, even if the interrupt function is out of order and the interrupt routine is not executed. Accordingly, when interruptions are included in the operation, it is necessary to organize the program so as to set a check point in the interrupt routine which calculates increased amounts of fuel or effects fuel cut off as shown in FIG. 3 to confirm the execution of the interrupt routine before outputting the program run signal $S_1$. In practical terms, it is sufficient to arrange that the program stores a flag in the memory unit 16 (RAM) to indicate that the interrupt routine has been executed and check the flag before executing the block which outputs the program run signal $S_1$.

The execution time varies in accordance with the data being processed at that time and in accordance with the program decisions conditions. Accordingly, a constant time interrupt may be used, by which the program is interrupted at fixed time intervals to execute a specified routine. Accordingly, if the program which outputs the program run signal $S_1$ is inserted in a routine executed by a constant time interrupt, the cycle for which the program run signal $S_1$ is output becomes constant, which facilitates signal processing. The program run signal $S_1$ may use the read/write signal of the computer as follows. Since the microcomputer has a bidirectional data bus, it outputs a read/write signal to inform peripheral devices whether the CPU 14 is in the read state or write state. When the microcomputer operates correctly, it outputs alternatively "1" or "0" according to the read/write signal. Conversely, if the program operation becomes erroneous, it continuously outputs either "1" or "0". Accordingly it is possible to use this signal as the program run signal $S_1$.

Figure 4:
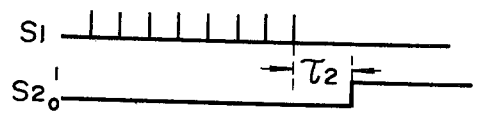
FIG. 4 shows wave forms of a program run signal and a command generated when the CPU fails to operate.

In FIG. 1, the monitor circuit 20 comprises a retriggerable monostable multivibrator. Since the retriggerable monostable multivebrator 20 is triggered by the program run the signal $S_1$, signal level of the command $S_2$ becomes zero when the program run signal $S_1$ is continuously supplied with a cycle shorter than the metastable time $\tau_2$, as shown in FIG. 4. However, if the program run signal $S_1$ fails to interrupt for a time more than $\tau_2$, the signal level of the command $S_2$ becomes 1. In practice, any suitable element can be employed as the monitoring circuit. However, in the preferred embodiment, the retriggerable monostable multivibrator such as model No. HD74LS123 of Hitachi, Ltd. is used. It should be understood, however, that any suitable device for producing the command $S_2$ responsive to failure of the CPU operation can be used.

It will be appreciated that the metastable time $\tau_2$ is set so as to be longer than the maximum of the cycle of the program run signal being output in the state of the normal program execution.

It is to be noted that the failure of the CPU can also be detected by checking the address element of the CPU output. In this case, a predetermined range is given for the address element. If the address element outputted by the CPU is not in the predetermined range, the CPU is considered to have failed.

Figure 5:
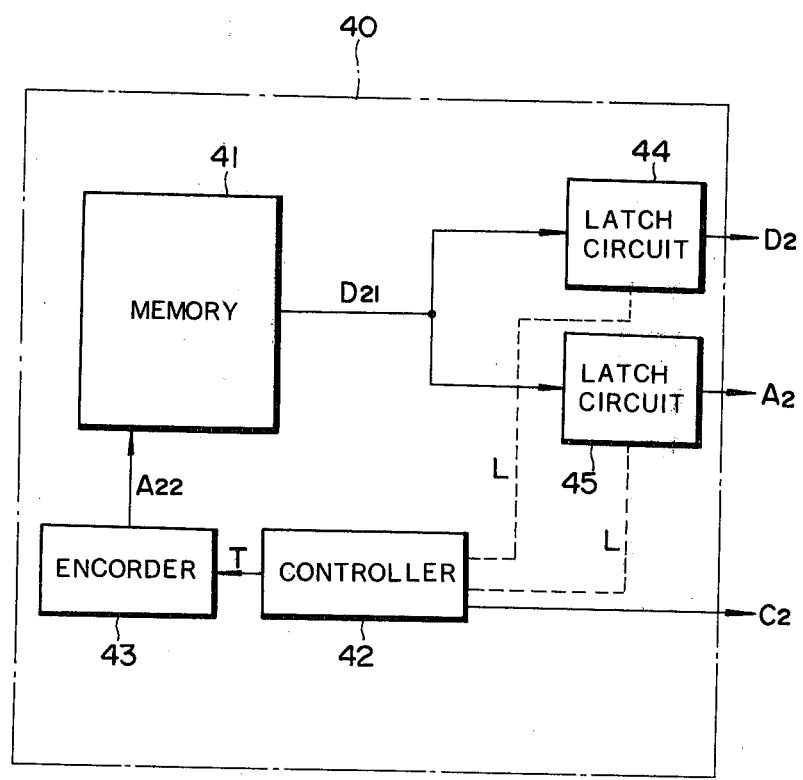
FIG. 5 is a schematic block diagram of a preferred embodiment of an output signal generator in the control system in FIG. 1.

Referring now to FIG. 5, there is schematically illustrated a preferred embodiment of the output signal generator 40 in FIG. 1. The output signal generator 40 generally comprises a memory unit 41 and a controller 42. In the shown embodiment, the memory unit 41 is selected to be the model 63LS080 of Monolithic Memories Inc. The memory unit 41 has a plurality of storage address in which are stored various data to replace the output of the CPU. The controller 42 has a clock pulse generator and a flip-flop. The clock pulse generator of the controller 42 generates a clock pulse to be fed to an encoder 43 interpositioned between the memory unit 41 and the controller 42. The encorder 43 includes a counter, such as, for example, the model HD74LS93 of Hitachi, Ltd. The counter of the encorder 43 counts up the clock pulse and generates an address signal $A_{22}$ corresponding to the counted pulse numbers. By the address signal $A_{22}$, the specific address in the memory unit 41 is accessed to output an output $D_{21}$. The output $D_{21}$ includes a data element and address element. The data element of the output $D_{21}$ is fed to a latch circuit 44, such as model HD74LS175 Hitachi, Ltd. Likewise, the address element of the output $D_{21}$ is fed to a latch circuit 45, such as model HD74LS175 of Hitachi, Ltd.

Both of the latch circuits 44 and 45 are also provided with a latch signal L which is a frequency division signal of the clock pulse generated by the flip-flop of the controller 42. In response to the latch signal L, the latch circuits 44 and 45 latch the respective inputs $D_{21}$ from the memory unit 41. On the other hand, the clock pulse generated by the clock pulse generator of the controller 42 is also outputted to the output unit 18 through the switching circuit 30. The clock pulse fed to the output unit 18 serves as a control signal $C_2$ for controlling the timing of the output unit for reading in the data element and address element of the output $D_{21}$.

If the program memory in the CPU 41 has a capacity for storing not only the data for execution of the CPU but also the data of the output signal generator 40, the memory unit 41 can be eliminated. In this case, the program memory is normally accessed by the CPU 14. If the CPU 14 fails, the encorder 43 operates to access the program memory to read out the data comprising data elements and address elements, responsive to the command $S_2$ fed from the monitor circuit 20. The data read out from the program memory is fed to the latch circuits 44 and 45. At this time, the data bus $D_2$, the address bus $A_2$ and the control bus $C_2$ are respectively connected with the output unit 18 through the switching circuit 30.

It should be noted that the output signal generator 40 can, indeed, always be operative and output the data even when the CPU is working normally. However, in the preferred embodiment, the clock pulse generator the controller 42 is maintained in inoperative while the CPU 14 executes in a normal manner and become operative in response to the command $S_2$ from the monitor circuit.

Further, it should be noted that the data stored in the memory unit 41 necessarily correspond to the vehicle device 50 to be controlled. For example, if the vehicle device controlled by the control system is a display unit, the data in the memory unit 41 shows on the display unit that the CPU has failed. In case that the vehicle device is the engine and the control system controls the fuel injection amount and timing and/or the spark ignition timing, fixed values enabling the engine to keep driving are stored in the memory unit 41.

While the present invention has been described in detail in terms of a specific preferred embodiment, various modifications can be expected without departing from the principle of the invention. If the microcomputer employed in the control system uses a common bus for feeding data elements and address elements by way of time sharing, the data elements and the address elements of the output $D_{21}$ from the memory unit 41 can be latched separately at the end of each respective transmission thereof.

What is claimed is:

1. A fail-safe device in an electronic control system for an automotive vehicle comprising:
    a microcomputer having a central processing unit and an output unit, and adapted to normally periodically executing a program, said microcomputer including an output means for generating control signals and a program run signal in response to the microcomputer executing the program, the program run signal having a predetermined periodically occurring characteristic only while the microcomputer normally periodically executes said program;
    a monitor circuit connected to said output means for receiving said program run signal in order to detect the failure of the microcomputer operation and for generating a command signal when the predetermined periodic characteristic of said program run signal does not occur for a time interval in excess of a predetermined interval greater than the period of the predetermined periodic characteristic;
    an output signal generator means for outputting preset control signals which are fixed and nonprogrammably determined during operation of said vehicle, said preset control signals corresponding to said control signals, and said output signal generator means including a memory unit for storing said preset control signals; and
    a switching circuit associated with said output unit of the microcomputer for selectively feeding said control signals and said preset control signals to said output unit, said switching circuit responsive to said command signal for changing the position thereof between a first position connecting said output means with said output unit for feeding said control signals to said output unit and a second position connecting said output signal generator means with said output unit for feeding said preset control signals to said output unit, said switching circuit being maintained in said first position in said microcomputer normal state and changed to said second position in response to said command signal indicative of microcomputer failure.

2. A fail-safe device in an electronic control system for an automotive vehicle comprising:
    a microcomputer having a central processing unit and an output unit, and adapted to normally periodically executing a program, said microcomputer including an output means for generating control signals and a program run signal in response to the microcomputer executing the program, the program run signal having a predetermined periodically occuring characteristic only while the microcomputer normally periodically executes said program;
    a monitor circuit connected to said output means for receiving said program run signal in order to detect failure of the microcomputer operation and for generating a command signal when the predetermined periodic characteristic of said program run signal does not occur for a time interval in excess of a predetermined interval greater than the period of the predetermined periodic characteristic;
    an output signal generator means including a memory unit storing preset control signals which are fixed and non-programmably determined during operation of said vehicle, said preset control signals corresponding to said control signals of said output means and effective for controlling a vehicle device to be controlled by the electronic control system, said memory unit being responsive to said command signal for outputting said preset control signals; and
    a switching circuit associated with said output unit of the microcomputer for selectively feeding said control signals and said preset control signals to said output unit, said switching circuit responsive to said command signal for changing the position thereof between a first position connecting said output means with said output unit for feeding said control signals to said output unit and a second position connecting said output signal generator means with said output unit for feeding said preset control signals to said output unit, said switching circuit being maintained in said first position in said microcomputer normal state and changed to said second position in response to said command signal indicative of microcomputer failure.

3. A device as set forth in claim 1 or 2, wherein said output signal generator means comprises
a controller generating a clock pulse;
an encorder for counting up the clock pulse fed from said controller said encoder addressing said memory unit; and
a latch circuit for latching the output from said memory unit.

4. A device as set forth in claim 3, wherein said controller is responsive to said command signal fed from the monitor circuit for generating said clock pulse.

5. A device as set forth in claim 3, wherein said latch circuit comprises a first section for latching a data element of said preset control signals and a second section for latching an address element.

6. A device as set forth in claim 5, wherein said first and second sections of the latch circuit latch the data element and the address element alternatively at different times.

7. A device as set forth in claim 4, wherein said central processing unit has a program memory and said memory unit in said output signal generator is said program memory.

8. A fail-safe device in an electronic control system for an automotive vehicle comprising:
a microcomputer having a central processing unit and an output unit, and adapted to normally periodically executing a program, said microcomputer including an output means for generating control signals and a program run signal in response to the microcomputer executing the program, the program run signal having a predetermined periodically occurring characteristic only while the microcomputer normally periodically executes said program;
a monitor circuit connected to said output means for receiving said program run signal in order to detect the failure of the microcomputer operation and for generating a command signal when the predetermined periodic characteristic of said program run signal does not occur for a time interval in excess of a predetermined interval greater than the period of the predetermined periodic characteristic;
an output signal generator means for outputting preset control signals which are fixed and nonprogrammably determined during operation of said vehicle, said preset control signals corresponding to said control signals, said output signal generator means including a memory unit for storing preset control signals in respective memory addresses and an address signal generator responsive to said command signal for producing an address signal for accessing the corresponding memory address for reading out said preset control signals, said preset control signals being composed of a data component and an address component; and
a switching circuit associated with said output unit of the microcomputer for selectively feeding said control signals and said preset control signals to said output unit, said switching circuit responsive to said command signal for changing the position thereof between a first position connecting said output means with said output unit for feeding said control signals to said output unit and a second position connecting said output signal generator means with said output unit for feeding said preset control signals to said output unit, said switching circuit being maintained in said first position in said microcomputer normal state and changed to said second position in response to said command, and said switching means adapted to feed both of said data components and said address component to said output unit.

9. A device as set forth in claim 1, 2 or 3, wherein said program run signal is generated by the central processing unit, responsive to a portion of said program which is cyclicly executed.

10. A device as set forth in claim 9, wherein said central processing unit executed said program which includes an interrupt routine and said program run signal is generated after execution of the interrupt routine.

11. A device as set forth in claim 9, wherein said central processing unit executes said program which includes an interrupt routine occurring at a constant periodic interval of time, said pulse run signal generated in response to execution of said interrupt routine.

12. A device as set forth in claim 9, wherein a read/write signal of the microcomputer is used as said program run signal showing the central processing unit operating in a normal state.

13. A device as set forth in claim 9, wherein said monitor circuit comprises a retriggerable monostable multivibrator.

* * * * *